United States Patent
Shiraishi et al.

(10) Patent No.: US 10,416,617 B2
(45) Date of Patent: Sep. 17, 2019

(54) INJECTION MOLDING SYSTEM FOR THE CALCULATION OF OPTIMUM OPERATING CONDITIONS AND MACHINE LEARNING THEREFOR

(71) Applicant: FANUC Corporation, Yamanashi (JP)

(72) Inventors: Wataru Shiraishi, Yamanashi (JP); Kazuhiro Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 438 days.

(21) Appl. No.: 15/221,697

(22) Filed: Jul. 28, 2016

(65) Prior Publication Data

US 2017/0031330 A1 Feb. 2, 2017

(30) Foreign Application Priority Data

Jul. 28, 2015 (JP) .................................. 2015-149010

(51) Int. Cl.
  *G05B 13/02* (2006.01)
  *G06N 20/00* (2019.01)
  (Continued)

(52) U.S. Cl.
  CPC ........ *G05B 13/0265* (2013.01); *B29C 45/762* (2013.01); *G05B 19/042* (2013.01);
  (Continued)

(58) Field of Classification Search
  CPC .......... G05B 19/41875; G05B 23/0294; G05B 23/0297; G05B 23/024; G05B 23/0283;
  (Continued)

(56) References Cited

U.S. PATENT DOCUMENTS 6,381,512 B1   4/2002   Saitou et al.
2002/0074676 A1   6/2002   Kachnic
(Continued)

FOREIGN PATENT DOCUMENTS

CN   1489514 A   4/2004
JP   H06-39889 A   2/1994
(Continued)

OTHER PUBLICATIONS

Office Action in JP Application No. 2015-149010, dated Aug. 2, 2016.
(Continued)

*Primary Examiner* — Michael J Brown
(74) *Attorney, Agent, or Firm* — Hauptman Ham, LLP

(57) ABSTRACT

Disclosed is an injection molding system including: a state observation section observing, when injection molding is performed, physical-amounts relating to the injection molding that is being performed; a physical-amount data storage section storing the physical-amount data; a reward-conditions setting section setting reward conditions for machine learning; a reward calculation section calculating a reward based on the physical-amount data and the reward conditions; an operating-conditions adjustment learning section performing machine learning of adjusting operating conditions based on the reward calculated by the reward calculation section, the operating conditions, and the physical-amount data; a learning-result storage section storing a learning result of the machine learning by the operating-conditions adjustment learning section; and an operating-conditions adjustment-amount output section determining and outputting an operating condition to be adjusted and an adjustment amount based on the machine learning by the operating-conditions adjustment learning section.

16 Claims, 3 Drawing Sheets

(51) Int. Cl.
*B29C 45/76* (2006.01)
*G05B 19/042* (2006.01)
*G06N 7/00* (2006.01)
*G05B 23/02* (2006.01)
*G06F 19/00* (2018.01)

(52) U.S. Cl.
CPC .............. *G06N 7/005* (2013.01); *G06N 20/00* (2019.01); *B29C 45/766* (2013.01); *B29C 2945/76949* (2013.01); *G05B 2219/39361* (2013.01); *G05B 2219/45244* (2013.01)

(58) Field of Classification Search
CPC .............. G05B 13/0265; G05B 19/182; G05B 19/4083; G06F 3/0484; G06F 19/00; G06N 99/005; G06N 5/04
USPC .................................................... 700/91, 200
See application file for complete search history.

(56) References Cited

U.S. PATENT DOCUMENTS

2013/0245807 A1    9/2013  Herbst
2016/0297130 A1*  10/2016  Esser ...................... B29C 45/78

FOREIGN PATENT DOCUMENTS

JP    H11-333899 A    12/1999
JP    2013-535064 A    9/2013

OTHER PUBLICATIONS

Office Action in CN Application No. 201610606362.4, dated Jun. 26, 2019, 14pp.

* cited by examiner

INJECTION MOLDING SYSTEM FOR THE CALCULATION OF OPTIMUM OPERATING CONDITIONS AND MACHINE LEARNING THEREFOR

RELATED APPLICATIONS

The present application claims priority to Japanese Application Number 2015-149010, filed Jul. 28, 2015, the disclosure of which is hereby incorporated by reference herein in its entirety.

BACKGROUND OF THE INVENTION

1. Field of the Invention

The present invention relates to an injection molding system and, in particular, to an injection molding system by which the calculation of optimum operating conditions is implemented without an adjustment by an operator.

2. Description of the Related Art

When a mold used for molding new molded articles is manufactured, it is necessary to calculate the optimum values of operating conditions including molding conditions prior to starting the mass production of the molded articles based on the mold. In an operating-conditions setting operation in which the optimum operating conditions of an injection molding machine are calculated, it is necessary for an operator to adjust various operating conditions to obtain the optimum operating conditions by referring to process monitoring data or the measurement of the weights of molded articles and confirming a molding state through the visual recognition of a molded article, while setting the operating conditions as rough standards based on his/her experience and performing a molding operation. Therefore, it is necessary for an operator to take time to calculate optimum operating conditions by adjusting various operating conditions and comparing molded articles molded based on the various operating conditions with each other.

Meanwhile, as conventional technologies for assisting the above operation of setting molding conditions by an operator, a technology in which molding conditions or molding data is stored in advance in a non-volatile memory and displayed for comparison, a technology in which past molding conditions are read and used in response to a request from an operator, and the like have been disclosed (see, for example, Japanese Patent Application Laid-open No. H06-039889 and Japanese Patent Application Laid-open No. H11-333899).

In the above operating-conditions setting operation by an operator, it takes time to calculate optimum operating conditions depending on the skills of the operator who performs the operation, or a difference occurs in the level (quality) of the optimum operating conditions depending on an operator. Therefore, there is a difficulty in calculating operating conditions under the same standard each time.

In addition, in the above operating-conditions setting operation, it is important to derive operating conditions by which reduction in consumption power during molding is implemented from the viewpoint of the manufacturing costs of molded articles at mass production. However, even a skilled operator has a difficulty in deriving operating conditions for molding with reduced consumption power while maintaining the high quality of molded products.

As disclosed in Japanese Patent Application Laid-open No. H06-039889 and Japanese Patent Application Laid-open No. H11-333899, such problems may not be solved only by storing the history of molding conditions and using the same.

SUMMARY OF THE INVENTION

In view of the above circumstances, the present invention has an object of providing an injection molding system by which it is possible to adjust operating conditions including molding conditions in a short period of time and perform molding with less consumption power.

An embodiment of the present invention provides an injection molding system provided with at least one injection molding machine and having artificial intelligence that performs machine learning, the injection molding system including: a state observation section that observes, when injection molding is performed by the injection molding machine, physical-amounts relating to the injection molding that is being performed; a physical-amount data storage section that stores the physical-amount data observed by the state observation section; a reward-conditions setting section that sets reward conditions for the machine learning; a reward calculation section that calculates a reward based on the physical-amount data observed by the state observation section and the reward conditions set by the reward-conditions setting section; an operating-conditions adjustment learning section that performs machine learning of adjusting operating conditions based on the reward calculated by the reward calculation section and operating conditions set in the injection molding system and the physical-amount data; a learning-result storage section that stores a learning result of the machine learning by the operating-conditions adjustment learning section; and an operating-conditions adjustment-amount output section that determines and outputs an operating condition to be adjusted and an adjustment amount on the basis of the learning result by the operating-conditions adjustment learning section.

In the injection molding system, the learning result stored in the learning-result storage section may be used in the learning of the operating-conditions adjustment learning section.

The injection molding system may further include a measurement section. In the injection molding system, the physical-amount data observed by the state observation section may include at least one of a weight and a size of a molded article measured by the measurement section, an appearance, a length, an angle, an area, and a volume calculated from image data on the molded article, an optical examination result of an optically molded article, and a measurement result of a strength of the molded article, and the physical-amount data storage section may also store other physical-amount data as the physical-amount data on the molded article.

In the injection molding system, input of the reward conditions to the reward-conditions setting section may be implemented by a display device provided in the injection molding machine.

In the injection molding system, the reward calculation section may give, when at least one of stabilization of physical-amount data, reduction in a cycle time, and energy saving is attained, a positive reward according to an extent of the attainment.

In the injection molding system, the reward calculation section may give, when at least one event from among destabilization of physical-amount data, an extension of a cycle time, and an increase in consumption energy occurs, a negative reward according to an extent of the event.

In the injection molding system, an allowable value may be set in advance in the physical-amount data, and the reward calculation section may give a positive reward when the physical-amount data falls within the allowable value.

In the injection molding system, an allowable value may set in advance in the physical-amount data, and the reward calculation section may give, when the physical-amount data deviates from the allowable value, a negative reward based on an amount of the deviation.

In the injection molding system, a target value may be set in advance in the physical-amount data, and the reward calculation section may give, when the physical-amount data comes close to the target value, a positive reward based on a deviation amount between the target value and the physical-amount data.

In the injection molding system, a target value may be set in advance in the physical-amount data, and the reward calculation section may give, when the physical-amount data deviates from the target value, a negative reward based on a deviation amount between the target value and the physical-amount data.

In the injection molding system, the reward calculation section may give, when a state showing a molding failure occurs, a negative reward according to an extent of the molding failure.

In the injection molding system, the molding failure includes at least one of a burr, a sink mark, a warp, an air bubble, a short shot, a flow mark, a weld line, a silver streak, a color irregularity, discoloration, carbonization, intrusion of impurities, deviation of an optical axis of a lens molded article from an allowable value, and a failure in a thickness of a molded article.

In the injection molding system, the operating conditions subjected to the machine learning by the operating-conditions adjustment learning section include at least one of mold clamping conditions, ejector conditions, injection dwell conditions, metering conditions, temperature conditions, nozzle touch conditions, resin supply conditions, mold-thickness conditions, molded-article extraction conditions, and hot-runner conditions.

The injection molding system may further include a robot serving as a molded-article extraction unit in which the molded-article extraction conditions are set.

In the injection molding system, at least one of the operating conditions may be fluctuated within a prescribed range to be learned by the operating-conditions adjustment learning section.

In the injection molding system, each of a plurality of injection molding systems may have a communication section to communicate with an outside, and physical-amount data stored in each of physical-amount data storage sections and a learning result stored in each of learning-result storage sections may be sent/received to be shared.

Another embodiment of the present invention provides a machine learning device that performs machine learning of adjusting operating conditions by an injection molding machine, the machine learning device including: a learning-result storage section that stores a learning result of adjusting the operating conditions; a state observation section that observes, when injection molding is performed by the injection molding machine, physical-amounts relating to the injection molding that is being performed; and an operating-conditions adjustment-amount output section that determines and outputs an operating condition to be adjusted and an adjustment amount based on the learning result stored in the learning-result storage section.

According to an embodiment of the present invention, it becomes possible to adjust various operating conditions in a short period of time and perform more stabilized molding by the application of machine learning to the calculation of optimum operating conditions. In addition, it becomes possible to perform molding with less consumption power. Moreover, it becomes possible to realize machine learning by which a more excellent result may be obtained for each of injection molding systems in such a way that molding data or learning data being adjusted is shared and used for the machine learning in the plurality of injection molding systems.

BRIEF DESCRIPTION OF THE DRAWINGS

The above and other objects and features of the present invention will become apparent from the descriptions of the following embodiments with reference to the accompanying drawings in which.

DETAILED DESCRIPTION OF THE PREFERRED EMBODIMENTS

Hereinafter, a description will be given of an embodiment of the present invention with reference to the drawings.

In the present invention, a machine learning device acting as artificial intelligence is introduced into an injection molding system to perform machine learning about operating conditions for injection molding, whereby the various operating conditions in the injection molding are adjusted. Thus, an injection molding system by which it is possible to calculate optimum operating conditions in a short period of time to further stabilize molding and attain further energy saving.

(1) Machine Learning

In general, machine learning is classified into various algorithms such as supervised learning and unsupervised learning according to its target or conditions. The present invention has an object of learning the operation of setting operating conditions for a mold. In consideration of the fact that the above injection molding system has parameters or the like not directly measurable under an injection environment and has a difficulty in explicitly indicating what type of action (adjustment of operating conditions) is appropriately performed with respect to a molded article resulting from an injection, a reinforcement learning algorithm in which a machine learning device automatically learns an action for achieving an object only with the acceptance of a reward is employed.

Figure 1:
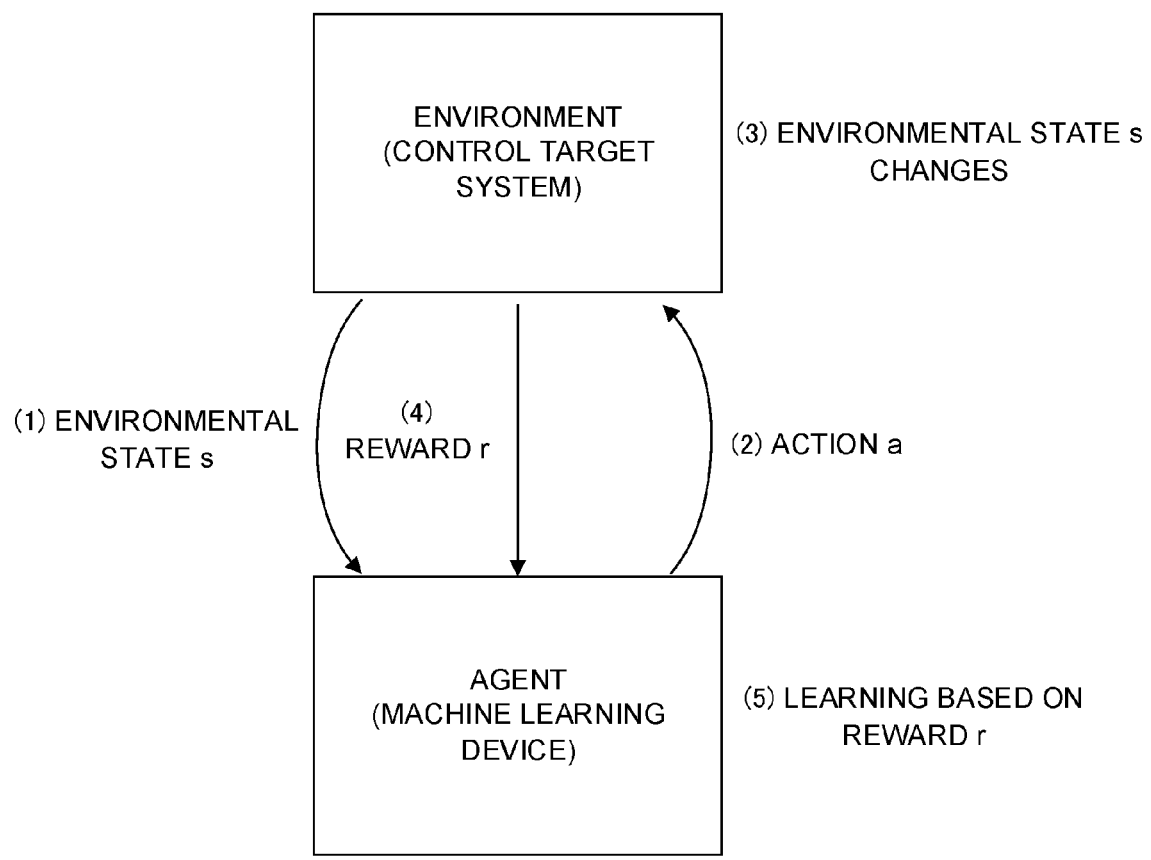
FIG. 1 a diagram for describing the basic concept of a reinforcement learning algorithm.

FIG. 1 is a diagram for describing the basic concept of a reinforcement learning algorithm. In reinforcement learning, agent learning and an action are advanced by the interactions between an agent (machine learning device) acting as a learning subject and an environment (control target system) acting as a control target. More specifically, the following interactions are performed between the agent and the environment.

(1) The agent observes an environmental state $s_t$ at certain time.
(2) The agent selects and performs an action $a_t$ that he/she is allowed to take based on an observation result and past learning.
(3) The environmental state $s_t$ changes to a next state $s_{t+1}$ after the action $a_t$ is performed.
(4) The agent accepts a reward $r_{t+1}$ based on the state change as a result of the action $a_t$.
(5) The agent advances the learning based on the state $s_t$, the action $a_t$, the reward $r_{t+1}$, and a past learning result.

In the learning of the above processing (5), the agent acquires the mapping of an observed state $s_t$, an action $a_t$, and a reward $r_{t+1}$ as reference information for determining an amount of a reward that he/she is allowed to obtain in the future. For example, when the number of states that the agent is allowed to have at each time is m and the number of actions that the agent is allowed to take is n, the agent obtains a two-dimensional arrangement of m×n, in which rewards $r_{t+1}$ corresponding to pairs of states $s_t$ and actions $a_t$ are stored, by repeatedly performing actions.

Then, with a value function (evaluation function) indicating to what degree a current state or action is valuable based on the above acquired mapping, the agent updates the value function (evaluation function) while repeatedly performing actions to learn an optimum action corresponding to a state.

A state value function is a value function indicating to what degree a certain state $s_t$ is valuable. The state value function is expressed as a function using a state as an argument and updated based on a reward obtained with respect to an action in a certain state, a value of a future state changed with the action, or the like in learning from repeated actions. The update formula of the state value function is defined according to a reinforcement learning algorithm. For example, in temporal-difference (TD) learning indicating as one of reinforcement learning algorithms, the state value function is defined by the following formula (1). Note that in the following formula (1), α indicates a learning coefficient, γ indicates a discount rate, and α and γ are defined as $0 < \alpha \le 1$ and $0 < \gamma \le 1$, respectively.

$$V(s_t) \rightarrow V(s_t) + \alpha[r_{t+1} + \gamma V(s_{t+1}) - V(s_t)] \quad \text{(Math. 1)}$$

In addition, an action value function is a value function indicating to what degree an action $a_t$ is valuable in a certain state $s_t$. The action value function is expressed as a function using a state and an action as arguments and updated based on a reward obtained with respect to an action in a certain state, an action value of a future state changed with the action, or the like in learning from repeated actions. The update formula of the action value function is defined according to a reinforcement learning algorithm. For example, in Q-learning indicating as one of typical reinforcement learning algorithms, the action value function is defined by the following formula (2). Note that in the following formula (2), α indicates a learning coefficient, γ indicates a discount rate, and α and γ are defined as $0 < \alpha \le 1$ and $0 < \gamma \le 1$, respectively.

$$Q(S_t, a_t) \leftarrow Q(s_t, a_t) + \alpha \left( r_{t+1} + \gamma \max_a Q(s_{t+1}, a) - Q(s_t, a_t) \right) \quad \text{(Math. 2)}$$

Note that as a method for storing a value function (evaluation function), a supervised learning device such as a support vector machine (SVM) and a neural network of a multiple-value output that output a value (evaluation) with a state $s_t$ and an action $a_t$ as inputs, for example, when the state s takes many states, or the like may be used besides a method using an approximate function and a method using an arrangement.

Further, in the selection of an action in the above processing (2), an action $a_t$ by which a reward ($r_{t+1} + r_{t+2} + \ldots$) over a future becomes maximum in a current state $s_t$ (an action for changing to a most valuable state when a state value function is used or a most valuable action in the state when an action value function is used) is selected using a value function (evaluation function) generated by past learning. Note that during learning, an agent may select a random action with a constant probability for the purpose of advancing the learning in the selection of an action in the above processing (2) (Epsilon (ε)-greedy method).

As described above, learning is advanced by repeatedly performing the above processing operations (1) to (5). Even in a new environment after the completion of learning in a certain environment, the learning may be advanced so as to be adapted to the new environment by additional learning. Accordingly, when the above processing is applied to the operation of setting operating conditions as in the present invention, the additional learning of the operation of setting the operating conditions in which the mold of the newly-molded article is set as a new environment is performed based on the past learning of the operation of setting the operating conditions, whereby it becomes possible to adjust various conditions in a short period of time.

In addition, reinforcement learning employs a system in which a plurality of agents is connected to each other via a network or the like, and information on states s, actions a, rewards r, or the like is shared between the agents and applied to each learning, whereby each of the agents performs dispersed reinforcement learning in consideration of the environments of the other agents to be allowed to perform efficient learning. Also in the present invention, when a plurality of agents (machine learning devices) controlling a plurality of environments (injection molding machines acting as control targets) performs dispersed reinforcement learning in a state of being connected to each other via a network or the like, the agents are allowed to efficiently learn the operation of setting operating conditions for a mold.

Note that although various methods such as Q-learning, an SARSA method, TD learning, and an AC method have been commonly known as reinforcement learning algorithms, any of the above reinforcement learning algorithms may be applied to the present invention. Note that since each of the reinforcement learning algorithms has been commonly known, its detailed description will be omitted in the specification.

Hereinafter, a description will be given, based on a specific embodiment, of the injection molding system of the present invention into which a machine learning device is introduced.

(2) Embodiment

Figure 2:
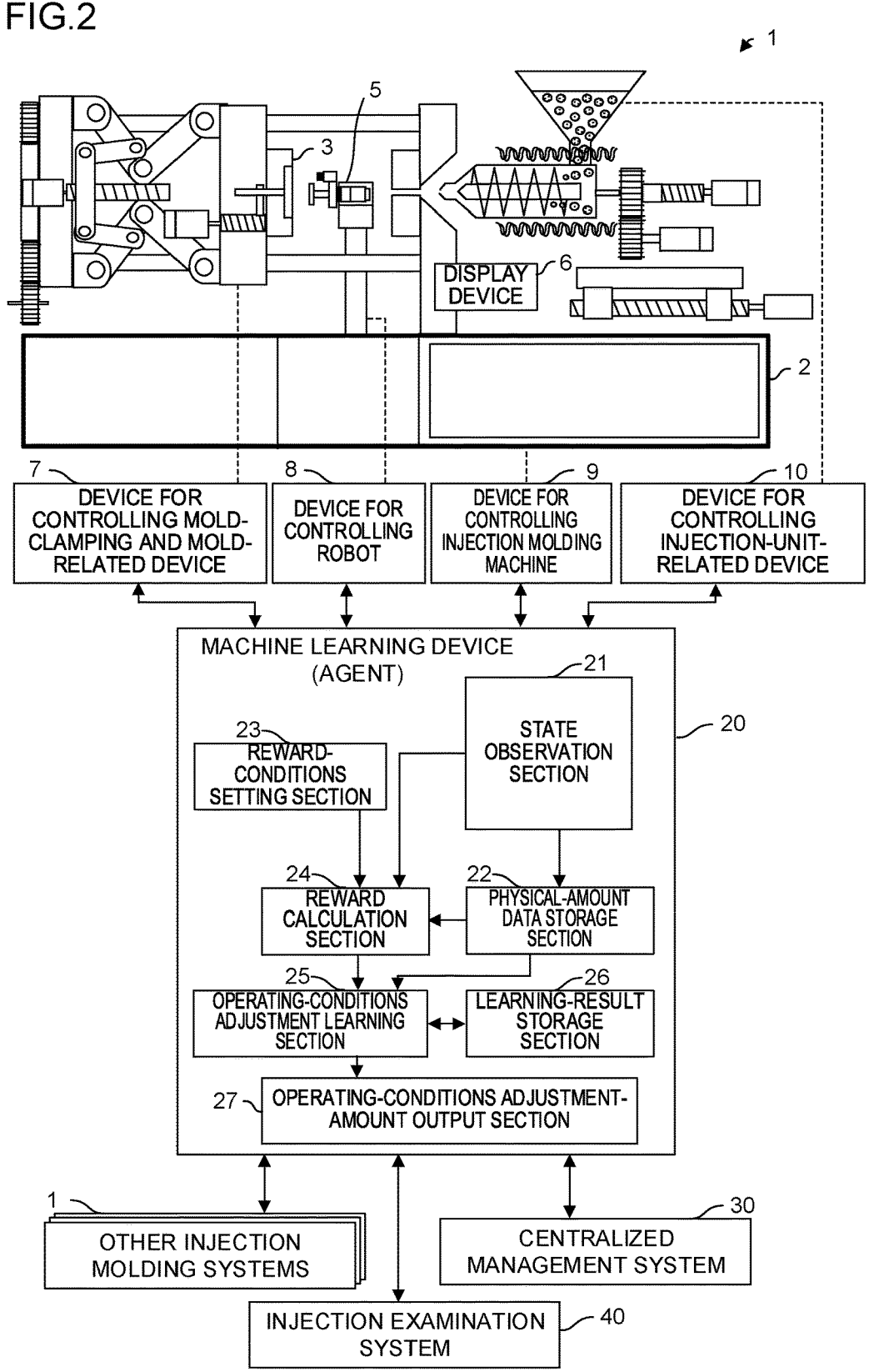
FIG. 2 is a schematic configuration diagram of an injection molding system according to an embodiment of the present invention.

FIG. 2 is a diagram showing the schematic configuration of an injection molding system according to an embodiment of the present invention. An injection molding system 1 of the embodiment is constituted by an injection molding machine 2, a mold 3, control targets such as other peripheral devices, a machine learning device 20 acting as artificial intelligence that performs machine learning, or the like. When the configurations shown in FIG. 2 are compared with the elements in the reinforcement learning shown in FIG. 1, the machine learning device 20 corresponds to the agent and the entirety including the injection molding machine 2, the mold 3, and the control targets such as other peripheral devices corresponds to the environment.

The injection molding system 1 is constituted by various devices, each of which may be provided with a control device, a sensor, or the like.

The control device of the injection molding machine 2 includes a device for controlling temperature of a nozzle, a cylinder and the lower part of a hopper, a device for controlling pressure, a device for controlling a nozzle touch force, or the like, besides a device for controlling mold clamping and mold related device 7 like a mold clamping force controlling device and device 9 for driving the opening/closing of a mold, the adjustment of the thickness of a mold, the ejector, the rotation of a screw, the back and forth movement of the screw, the back and forth movement of an injection unit, and device for controlling injection unit related device 10 like a rotation of a feeder for an appropriate amount supply device, or the like.

The control device of the mold 3 includes a device for controlling a temperature of a mold, a device for controlling a hot-runner temperature and the opening/closing of a hot-runner nozzle, a device for controlling a movable member for injection compression, a device for controlling a core set and a core pull, a device for controlling a slide table and a rotary table for multi-color molding or the like, a device for switching a flow path of a material for multi-color molding, a device for oscillating a mold, or the like.

The peripheral devices include, besides a molded article extracting device (robot) 5 controlled by a device for controlling robot 8, a device for inserting an inserting article, a device for inserting an insert, a device for feeding a foil for in-mold treatment, a device for feeding a hoop for hoop molding, a device for filling gas for gas assist molding, a device for filling gas for foam molding using a supercritical fluid, a device for filling long fibers, a device for mixing two components together for LIM molding, a device for removing burrs from a molded article, a device for cutting a runner, a scale for a molded article, a machine for examining a strength of a molded article, a device for optically examining a molded article, a device for imaging a molded article and an image processing device, a robot for carrying a molded article, or the like.

Some of the above control devices are provided with a sensor to perform feedback control or feedforward control based on a closed loop. In addition, some of the above control devices are used only to output data.

Further, the machine learning device 20 that performs machine learning is provided with a state observation section 21, a physical-amount data storage section 22, a reward-conditions setting section 23, a reward calculation section 24, an operating-conditions adjustment learning section 25, a learning-result storage section 26, and an operating-conditions adjustment-amount output section 27. The machine learning device 20 may be provided inside the injection molding machine 2, or may be provided in a personal computer or the like outside the injection molding machine 2.

The state observation section 21 is a function section that observes physical-amount data regarding injection molding output from each of the devices of the injection molding system 1 and imports the observed state data in the machine learning device 20. The physical-amount data includes a temperature, a position, a speed, an acceleration, a current, a voltage, a pressure, a time, image data, image analysis data, a torque, a power, a distortion, a consumption power, a mold opening amount, a backflow amount, a tie bar deformation amount, a heater heating ratio, a weight of a molded article, a strength of a molded article, a size of a molded article, an appearance calculated from image data on a molded article, a length of each part of a molded article, an angle, an area, a volume, an optical examination result of an optically molded article, a measurement result of a strength of a molded article, a deviation amount of an optical axis of a transparent molded article, a calculation value calculated by the arithmetic processing of each physical amount, or the like. By the combinations of the above physical-amount data items, the environmental state s used in machine learning is defined.

The physical-amount data storage section 22 is a function section that receives and stores physical-amount data and outputs the stored physical-amount data to the reward calculation section 24 and the operating-conditions adjustment learning section 25. The physical-amount data storage section 22 stores physical-amount data observed by the state observation section 21 during injection molding as physical-amount data on a molded article molded by the injection molding. The physical-amount data input to the physical-amount data storage section 22 may be data acquired by the latest molding operation or data acquired by a past molding operation. In addition, it is also possible for the physical-amount data storage section 22 to receive and store physical-amount data stored in other injection molding systems 1 or an centralized management system 30, or is possible for the physical-amount data storage section 22 to output physical-amount data stored in the physical-amount data storage section 22 to other injection molding systems 1 or an centralized management system 30.

The reward-conditions setting section 23 is a function section that sets conditions for giving a reward in machine learning. Positive and negative rewards are given and may be appropriately set. In addition, an input to the reward-conditions setting section 23 may be performed via a personal computer, a tablet terminal, or the like used in the centralized management system 30. However, with an input via a display device 6 of the injection molding machine 2, it becomes possible to perform easier settings.

The reward calculation section 24 analyzes physical-amount data input from the state observation section 21 or the physical-amount data storage section 22 based on conditions set by the reward-conditions setting section 23, and outputs a calculated reward to the operating-conditions adjustment learning section 25. The reward output from the reward calculation section 24 corresponds to a reward r used in machine learning.

Hereinafter, a description will be given of an example of reward conditions set by the reward-conditions setting section 23 according to the embodiment.

(Reward 1: Case in which Positive Reward is Given when at Least One of Stabilization of Physical-Amount Data, Reduction in Cycle Time, and Energy Saving is Attained)

In the determination of the stabilization of physical-amount data, when reduction in fluctuations is attained as a result of the statistical processing of the physical-amount data, a positive reward may be given according to its reduction degree. As an index of the fluctuations, it is general to use a standard deviation.

In the determination of reduction in a cycle time, when the cycle time is reduced, a positive reward is given according to its reduction degree.

In the energy saving, when the consumption power of the injection molding machine alone, the consumption power of the entire injection molding system, the total consumption power of a plurality of injection molding systems, or the like as an index is reduced, a positive reward is given according to its reduction degree.

Conversely, when the destabilization of physical-amount data, the extension of a cycle time, and increase in consumption energy are caused, a negative reward is given according to their degrees.

(Reward 2: Case in which Allowable Values are Set in Advance in Physical-Amount Data and Reward Calculation Section Gives Positive Reward when Physical-Amount Data Falls within Allowable Values)

When it is known that burrs occur in a molded article at a maximum injection pressure of 200 MPa or higher and a short shot occurs in the molded article at a maximum injection pressure of 190 MPa or lower, an injection pressure in an injection step is caused to have an maximum pressure of 200 MPa and a minimum pressure of 190 Mpa as allowable values. When physical-amount data falls within the allowable values, a positive reward is given. On the other hand, when the physical-amount data does not fall within the allowable values, a negative reward may be given according to its deviation amount. That is, the greater the deviation amount, the greater the negative reward may be given.

Figure 3:
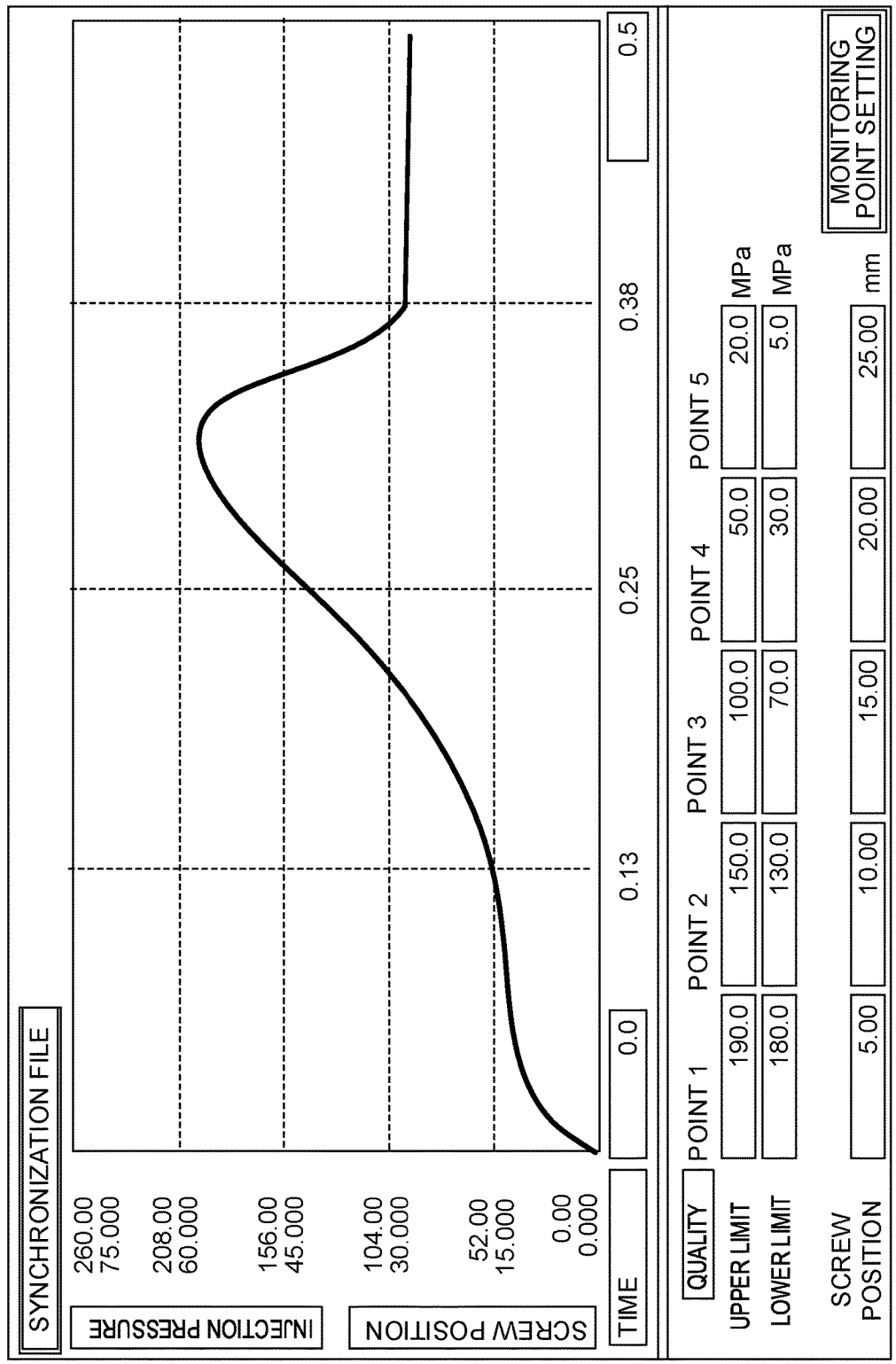
FIG. 3 is a diagram showing an example of displaying injection dwell pressure data in one shot using a pressure waveform.

In addition, as shown in FIG. 3, it is known that the screen of the injection molding machine has the function of displaying injection dwell pressure data in one shot using a pressure waveform based on a horizontal axis (a time or a screw position) and a vertical axis (pressure) and has the function of displaying an alert message or quality discrimination when the waveform does not fall within upper and lower limits set in a plurality of intervals of the pressure waveform. It is also possible to give a reward to the pressure waveform with the upper and lower limits set in the pressure waveform as allowable values set by the reward-conditions setting section 23.

(Reward 3: Case in which Target Value is Set in Advance in Physical-Amount Data and Reward Calculation Section Gives Positive Reward According to Deviation Amount Between Target Amount and Physical-Amount Data when Physical-Amount Data Gets Close to Target Value)

With a target value set in a weight of a molded article based on a mold design and resin selection, a greater positive reward may be given as the weight of the molded article gets closer to the target value.

Conversely, a negative reward may be given based on the deviation amount between the target value and physical-amount data when the physical-amount data deviates from the target value. In addition, provided that a further negative reward is given based on a change ratio when the change ratio of the deviation amount increases, it becomes possible to give a much greater negative reward if the deviation amount increases with accelerating speed.

Moreover, by the combination of the above setting of allowable values in Reward 2 and the above setting of a target value in Reward 3, the target value may be set near an upper-limit allowable value. A resin used in injection molding has factors causing fluctuations in molecular-amount distribution and melting-time viscosity depending on a lot even in the same grade. Therefore, there is a likelihood that the probability of the occurrence of a short shot increases near a lower-limit allowable value even if molding is performed within the allowable values. In order to avoid such a risk, the target value is set to be less than or equal to the upper-limit allowable value and set to be near the upper-limit allowable value. Thus, the molding is stabilized within the range of allowable values and near the upper-limit allowable value, whereby reduction in the probability of the occurrence of a short shot is made possible. As described above, it is also possible to use a plurality of reward conditions in combination.

(Reward 4: Case in which Negative Reward is Given when State Showing Molding Failure Occurs)

A negative reward is given when a molding failure such as a burr, a sink mark, a warp, an air bubble, a short shot, a flow mark, a weld line, a silver streak, color irregularities, discoloration, carbonization, intrusion of impurities, deviation of an optical axis of a lens molded article outside an allowable value, and a failure in the thickness of a molded article occurs in an image obtained by photographing the molded article or image analysis data obtained by analyzing the image or is detected by an optical examination device or the like.

In addition, a size of a negative reward may be changed according to a degree of such a failure. For example, when discoloration occurs, a degree of the discoloration is digitized by a colorimeter, an image analysis of a photographed image, or the like and a size of a negative reward is changed according to the degree of the discoloration.

Referring back to FIG. 2, the operating-conditions adjustment learning section 25 performs machine learning (reinforcement learning) based on physical-amount data, the adjustment of operating conditions including the molding conditions of the injection molding system performed by itself, and a reward calculated by the reward calculation section 24. At this time, the operating-conditions adjustment learning section 25 may perform the machine learning (reinforcement learning) using a learning result stored in the learning-result storage section 26 that will be described later.

Then, the operating-conditions adjustment-amount output section 27 that will be described later outputs, based on a learning result of the operating-conditions adjustment learning section 25, adjustment amounts of operating conditions for the injection molding system such as mold clamping conditions, ejector conditions, injection dwell conditions, metering conditions, temperature conditions, nozzle touch conditions, resin supply conditions, mold-thickness conditions, molded-article extraction conditions, hot-runner conditions, and setting conditions of the control device or the like of each of the peripheral devices. Here, the adjustment of the operating conditions corresponds to the action a used in the machine learning.

Here, in the machine learning performed by the operating-conditions adjustment learning section 25, a state $s_t$ is defined by the combination of physical-amount data at certain time t, and the adjustment of the operating conditions for the injection molding system performed with respect to the defined state $s_t$ and the output of an adjustment result from the operating-conditions adjustment-amount output section 27 that will be described later are equivalent to an action $a_t$. Then, a value calculated by the reward calculation section 24 based on data obtained as a result of injection molding according to the adjustment result is equivalent to a reward $r_{t+1}$. A value function used in the learning is determined according to an applied learning algorithm. For example, when Q-learning is used, it is only necessary to update an action value function $Q(s_t, a_t)$ according to the above formula (2) to advance the learning.

In addition, provided that each of the operating conditions is set at its initial value in advance, at least one of the operating conditions may be fluctuated within a prescribed range to perform the learning. For example, the learning is performed based on a physical amount obtained when a screw rotation speed at metering is automatically increased by 10 rpm from the initial value 100 rpm to perform molding and a physical amount obtained when back pressure is automatically increased by 1 MPa from the initial value 5 MPa to perform the molding. Thus, it becomes possible to learn the combination of a screw rotation speed and back pressure at which consumption power becomes minimum within a range in which an excellent article may be stably molded without the occurrence of a molding failure.

In addition, it may be possible that an ε-greedy method described above is employed and a random action is selected with a prescribed probability to advance the learning.

Note that the device 5 for extracting a molded article to which the molded-article extraction conditions are set may be an articulated robot. Since a general extraction machine is not allowed to extract an extremely fragile molded article (green body) as in metal injection molding (MIM)—or the like, a robot may extract the molded article at a low speed with a minimum holding force. However, since a molded-article extraction speed has a great impact on a cycle time, it is preferable to perform learning by which a molded article is extracted at a higher speed so as not to be broken. It is possible to output and determine the presence or absence of the breakage of a molded article as physical-amount data based on the measurement of a weight, the image analysis, or the like of the molded article.

The learning-result storage section 26 stores a learning result of the operating-conditions adjustment learning section 25. Further, when a learning result is used by the operating-conditions adjustment learning section 25 again, the learning-result storage section 26 outputs a stored learning result to the operating-conditions adjustment learning section 25. As described above, a learning result may be stored in such a way that a value function corresponding to a machine learning algorithm to be used is stored in a supervised learning device such as a SVM (Support Vector Machine) and a neural network of an approximate function, an arrangement, or a multiple-value output, or the like.

Note that it is also possible for the learning-result storage section 26 to receive and store a learning result stored in other injection molding systems 1 or the centralized management system 30, or is possible for the learning-result storage section 26 to output a learning result stored in the learning-result storage section 26 to other injection molding systems 1 or the centralized management system 30.

The operating-conditions adjustment-amount output section 27 determines and outputs an operating condition to be adjusted and an adjustment amount on the basis of a learning result of the operating conditions learned by the operating-conditions adjustment learning section 25. In the determination of an adjustment amount, for example, the combinations of operating conditions to be adjusted and adjustment amounts possibly taken in a current state are evaluated according to an evaluation function on the basis of on the learning of the operating-conditions adjustment learning section 25, and among them the combination having the highest evaluation is determined. Then, after the output of an adjustment amount from the operating-conditions adjustment-amount output section 27, the learning is repeatedly performed using physical-amount data input to the state observation section 21 again. Thus, the acquisition of a more excellent learning result is allowed. In addition, a random action may be selected with a prescribed probability as described above to advance the learning.

Moreover, it is possible to perform, in order to give a maximum reward, machine learning using physical-amount data and an evaluation function in which an operation is expressed by an argument. The machine learning may be performed while physical-amount data on the latest molding is acquired, or may be performed using acquired physical-amount data stored in the physical-amount data storage section.

In performing the machine learning, it is possible to fluctuate at least one of the operating conditions within a prescribed range to be learned by the operating-conditions adjustment learning section 25. By intentionally fluctuating the operating conditions to be learned, it becomes possible to efficiently perform the learning of an impact on the fluctuation.

Furthermore, when each of the plurality of injection molding systems 1 is further provided with a section used to communicate with an outside, it becomes possible to send/receive and share physical-amount data stored in each of the physical-amount data storage sections 22 and a learning result stored in each of the learning-result storage sections 26. Thus, more efficient machine learning is allowed. For example, when operating conditions are fluctuated within a prescribed range to perform learning, the learning may be efficiently performed in such a way that physical-amount data and learning data are exchanged between the injection molding systems 1 to advance the learning in parallel while different operating conditions are fluctuated within a prescribed range to perform molding in the plurality of injection molding systems 1.

In order to exchange physical-amount data and learning data between a plurality of injection molding systems 1 as described above, communication may be performed via a host computer such as the centralized management system 30, the injection molding systems 1 may directly communicate with each other, or a cloud may be used. However, for handling large amounts of data, a communication section with a faster communication speed is preferably provided.

The embodiment of the present invention is described above. However, the present invention is not limited only to the example of the above embodiment and may be carried out in various aspects with appropriate modifications.

The invention claimed is:

1. An injection molding system provided with at least one injection molding machine and having artificial intelligence that performs machine learning, the injection molding system comprising:

a state observation section that observes, when injection molding is performed by the injection molding machine, physical amounts relating to the injection molding that is being performed;

a physical-amount data storage section that stores the physical-amount data observed by the state observation section;

a reward-conditions setting section that sets reward conditions for the machine learning;

a reward calculation section that calculates a reward based on the physical-amount data observed by the state observation section and the reward conditions set by the reward-conditions setting section;

an operating-conditions adjustment learning section that performs machine learning of adjusting operating conditions based on the reward calculated by the reward calculation section and operating conditions set in the injection molding system and the physical-amount data;

a learning-result storage section that stores a learning result of the machine learning by the operating-conditions adjustment learning section; and an operating-conditions adjustment-amount output section that determines and outputs an operating condition to be adjusted and an adjustment amount on the basis of the learning result by the operating-conditions adjustment learning section.

2. The injection molding system according to claim 1, wherein the learning result stored in the learning-result storage section is used in the learning of the operating-conditions adjustment learning section.

3. The injection molding system according to claim 1, further comprising:
a measurement section, wherein the physical-amount data observed by the state observation section includes at least one of a weight and a size of a molded article measured by the measurement section, an appearance, a length, an angle, an area, and a volume calculated from image data on the molded article, an optical examination result of an optically molded article, and a measurement result of a strength of the molded article, and the physical-amount data storage section also stores other physical-amount data as the physical-amount data on the molded article.

4. The injection molding system according to claim 1, wherein input of the reward conditions to the reward-conditions setting section can be implemented by a display device provided in the injection molding machine.

5. The injection molding system according to claim 1, wherein, when at least one of stabilization of physical-amount data, reduction in a cycle time, and energy saving is attained, the reward calculation section gives a positive reward according to an extent of the attainment.

6. The injection molding system according to claim 1, wherein, when at least one event from among destabilization of physical-amount data, an extension of a cycle time, and an increase in consumption energy occurs, the reward calculation section gives a negative reward according to an extent of the event.

7. The injection molding system according to claim 1, wherein an allowable value is set in advance in the physical-amount data, and the reward calculation section gives a positive reward when the physical-amount data falls within the allowable value.

8. The injection molding system according to claim 1, wherein an allowable value is set in advance in the physical-amount data, and the reward calculation section gives, when the physical-amount data deviates from the allowable value, a negative reward based on an amount of the deviation.

9. The injection molding system according to claim 1, wherein a target value is set in advance in the physical-amount data, and the reward calculation section gives, when the physical-amount data comes close to the target value, a positive reward based on a deviation amount between the target value and the physical-amount data.

10. The injection molding system according to claim 1, wherein a target value is set in advance in the physical-amount data, and the reward calculation section gives, when the physical-amount data deviates from the target value, a negative reward based on a deviation amount between the target value and the physical-amount data.

11. The injection molding system according to claim 1, wherein, when a state showing a molding failure occurs, the reward calculation section gives a negative reward according to an extent of the molding failure.

12. The injection molding system according to claim 11, wherein the molding failure includes at least one of a burr, a sink mark, a warp, an air bubble, a short shot, a flow mark, a weld line, a silver streak, a color irregularity, discoloration, carbonization, intrusion of impurities, deviation of an optical axis of a lens molded article from an allowable value, and a failure in a thickness of a molded article.

13. The injection molding system according to claim 1, wherein the operating conditions subjected to the machine learning by the operating-conditions adjustment learning section include at least one of mold clamping conditions, ejector conditions, injection dwell conditions, metering conditions, temperature conditions, nozzle touch conditions, resin supply conditions, mold-thickness conditions, molded-article extraction conditions, and hot-runner conditions.

14. The injection molding system according to claim 13, further comprising:
a robot serving as a molded-article extraction unit in which the molded-article extraction conditions are set.

15. The injection molding system according to claim 1, wherein at least one of the operating conditions is fluctuated within a prescribed range to be learned by the operating-conditions adjustment learning section.

16. The injection molding system according to claim 1, wherein each of a plurality of injection molding systems has a communication section to communicate with an outside, and physical-amount data stored in each of physical-amount data storage sections and a learning result stored in each of learning-result storage sections are sent/received to be shared.

* * * * *